(12) United States Patent
Okubo

(10) Patent No.: US 8,378,810 B2
(45) Date of Patent: Feb. 19, 2013

(54) COMMUNICATION DEVICE

(75) Inventor: Takuya Okubo, Kariya (JP)

(73) Assignee: Denso Corporation, Kariya (JP)

( * ) Notice: Subject to any disclaimer, the term of this patent is extended or adjusted under 35 U.S.C. 154(b) by 424 days.

(21) Appl. No.: 12/656,121

(22) Filed: Jan. 19, 2010

(65) Prior Publication Data

US 2010/0190462 A1 Jul. 29, 2010

(30) Foreign Application Priority Data

Jan. 29, 2009 (JP) .................................... 2009-18714

(51) Int. Cl.
*G08B 1/08* (2006.01)
*G08C 19/16* (2006.01)

(52) U.S. Cl. ............. 340/538.12; 340/12.1; 340/538.11; 340/12.38

(58) Field of Classification Search ............. 340/538.2, 340/538.1, 538.11, 310.05, 310.01, 12.32, 340/12.34, 12.37, 12.38, 12.33; 455/298
See application file for complete search history.

(56) References Cited

U.S. PATENT DOCUMENTS

| | | | |
|---|---|---|---|
| 7,113,557 B2 | 9/2006 | Kaku et al. | |
| 7,262,582 B2 | 8/2007 | Warita et al. | |
| 7,701,152 B2 * | 4/2010 | Williams | ...................... 315/360 |
| 2004/0207263 A1 | 10/2004 | Yanagida et al. | |
| 2006/0256050 A1 | 11/2006 | Ikeda | |

FOREIGN PATENT DOCUMENTS

| | | | |
|---|---|---|---|
| JP | A-49-124944 | | 11/1974 |
| JP | 09130709 A | * | 5/1997 |
| JP | A-9-130709 | | 5/1997 |
| JP | 10256992 A | * | 9/1998 |
| JP | A-10-256992 | | 9/1998 |
| JP | A-2001-195538 | | 7/2001 |
| JP | A-2003-163603 | | 6/2003 |
| JP | A-2003-283261 | | 10/2003 |

OTHER PUBLICATIONS

JP H10-256992 to Fujiwara et al, machine translation.*
JP 2001-195538 to Kiminari et al, machine translation.*
JP 9-130709 to Michio, machine translation.*
JP 2003163603 to Masashi et al, machine translation.*
Office Action mailed on Mar. 29, 2011 issued from the Japanese Patent Office in the corresponding Japanese patent application No. 2009-018714 (and English translation).

* cited by examiner

*Primary Examiner* — Daniel Wu
*Assistant Examiner* — Mancil Littlejohn
(74) *Attorney, Agent, or Firm* — Posz Law Group, PLC

(57) ABSTRACT

In a signal shaper circuit provided between a VICS antenna, which receives a VICS signal and outputs reception input data signal, and a navigation CPU for signal processing, a low pass filter of a resistor and a capacitor is provided. The cutoff frequency of the low pass filter is set to pass light modulation noise included in the input data signal but cut off the input data signal, which is higher in frequency than the light modulation noise. The input data signal is compared with the filter-processed signal used as a reference signal by a comparator. As a result, a final output data signal is outputted in a waveform-shaped form and without loss of data.

11 Claims, 5 Drawing Sheets

COMMUNICATION DEVICE

CROSS REFERENCE TO RELATED APPLICATION

This application is based on and incorporates herein by reference Japanese patent application No. 2009-018714 filed on Jan. 29, 2009.

BACKGROUND OF THE INVENTION

The present invention relates to a communication device, in which a power supply line for supplying electric power to a receiver circuit is used for transmitting a reception signal of the receiver circuit.

A conventional inter-vehicle communication device mounted in a vehicle transmits and receives electrical beacon signals and optical beacon signals to communicate with roadside devices provided along travel roads, as disclosed in the following patent document 1. In this inter-vehicle communication device, a transmitter/receiver circuit for transmitting and receiving the electrical beacon signal and the optical beacon signal is positioned on a dashboard in a vehicle, for example, so that electric wave and light are easily transmitted and received. Thus, the transmitter/receiver circuit is formed separately from a main circuit for processing transmission and reception signal of the electrical beacon and the optical beacon.

For simplifying wiring in the vehicle, the transmitter/receiver circuit and the main circuit are connected via a single electrical line thereby to not only supply electric power from the main circuit to the transmitter/receiver circuit and transmit and receive the transmission and reception signal of the electrical beacon and the optical beacon by multiplexing.
Patent document 1: JP 10-256992A The electrical beacon signal and the optical beacon signal are used to supply various road traffic information to vehicles. The electrical beacon signal and the optical beacon signal are transmitted to a navigation device so that the received road traffic information is provided to passengers by way of map display or voice announcement in the vehicle.

More and more navigation devices recently use a thin liquid crystal display panel as a display device and light emitting diodes as a backlight source of the liquid crystal display panel. The light emitting diode is used, because it is more advantageous than a cold cathode tube in respect of environmental protection, low voltage driving and low temperature operation characteristics.

The luminance of the backlight source (brightness of the liquid crystal display panel) is normally adjustable by a user in accordance with changes in brightness of the surrounding area between day and night. For example, the light emitting diodes used as the backlight source are connected in series with a switching element so that supply of current to the light emitting diodes are turned on and off by turning on and off the switching element. The light emitting diodes are driven to emit light in a desired luminance by controlling the duty ratio of a pulse-width modulation (PWM) signal, which turns on and off the switching element connected in series with the light emitting diodes.

When the current supply to the light emitting diodes is turned from on to off or from off to on, the input voltage supplied to the light emitting diodes is changed correspondingly by the change in the current supply. Thus, light modulation noise develops on a power supply line. Such noise on the power supply line influences other devices such as a transmitter/receiver circuit, which is connected to the same power supply line.

In the optical beacon, in which the power voltage and the reception signal are multiplexed on the single signal line, the light modulation noise on the single signal line will in some cases cause loss of a part of the reception signal received from an external site when the reception signal is transmitted to succeeding circuit stages in the communication device. As a result, the road traffic information cannot be acquired properly.

SUMMARY OF THE INVENTION

It is therefore an object of the present invention to provide a communication device, which has high noise-proof characteristic so that a reception signal may be transmitted properly even when noise develops on a power supply line for supplying electric power to a receiver circuit.

According to one aspect, a communication device comprises a power supply line, a receiver circuit, a low pass filter and a comparator. The power supply line supplies electric power. The receiver circuit is connected to the power supply line and receives a communication signal from an external site and outputs a reception signal to a signal processing circuit through the power supply line. The reception signal includes a frequency component higher than a predetermined frequency of noise, which develops on the power supply line. The low pass filter is connected between the receiver circuit and the signal processing circuit and passes the noise of the predetermined frequency as a reference signal and cuts off the reception signal of frequencies higher than the predetermined frequency. The comparator is provided to receive the reception signal through the power supply line and the reference signal from the low pass filter and produce an output data signal as a result of comparison of the reception signal and the reference signal.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to embodiments, in which a communication device according to the present invention is included in an in-vehicle system.

Figure 1:
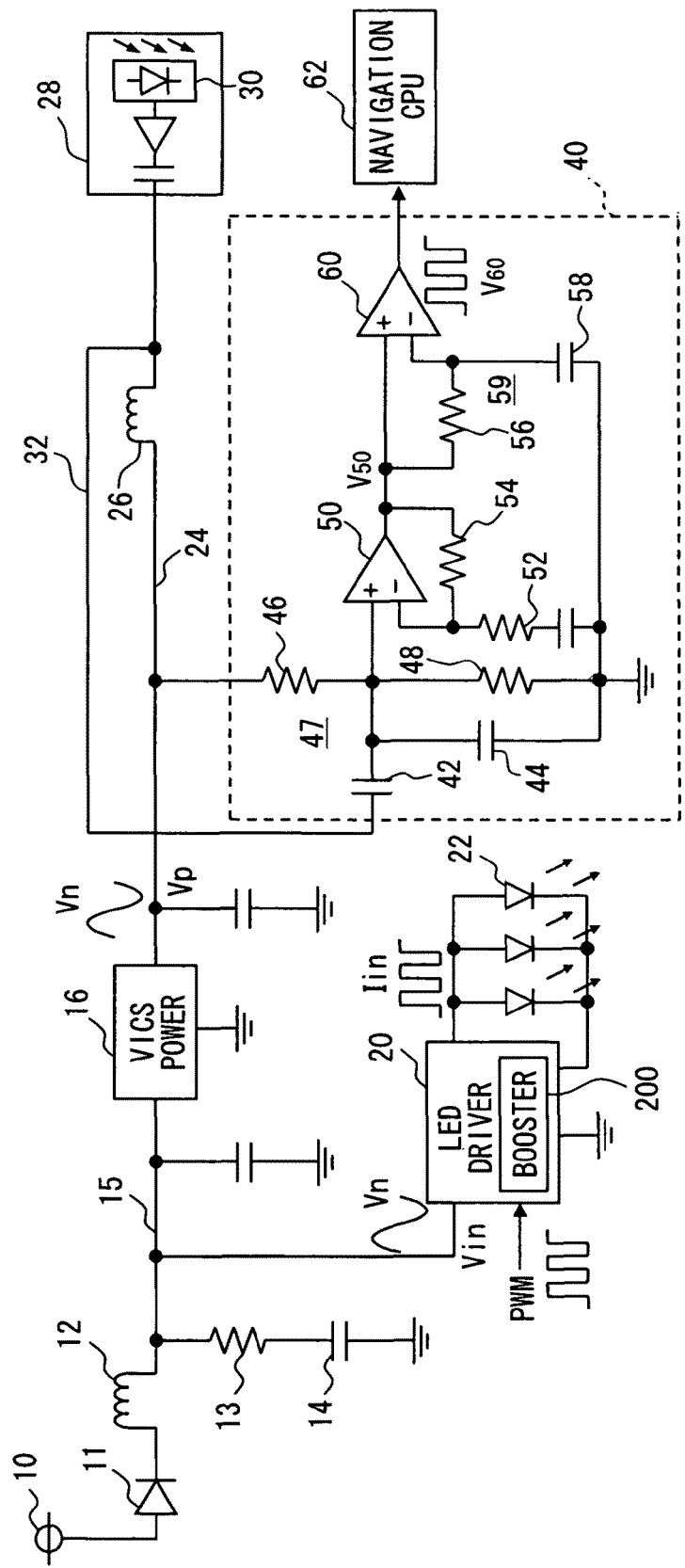
FIG. 1 is an electric circuit diagram showing an in-vehicle system including a communication device according to an embodiment of the present invention.

According to one embodiment shown in FIG. 1, the communication device is mounted in a vehicle and configured to receive, by using a vehicle information and communication system (VICS), a VICS signal related to road traffic information. The present embodiment is not limited to such a communication device, which receives the VICS signal of the vehicle information and communication system, but may be a communication device, which receives other communication signals such as a road traffic information signal of a radio data system-traffic message channel (RDS-TMC) or a XM satellite radio. The road traffic information acquired by receiving the VICS signal is provided by superimposing on a road map or by sound announcement in the vehicle as described below.

Referring to FIG. 1, an in-vehicle power source 10 includes a DC battery and a generator such as an alternator mounted in a vehicle. A diode 11 and a reactor 12 are connected in series in a power supply line 15, which supplies DC power from the in-vehicle power source 10. The power supply line 15 is grounded through a capacitor 14. The reactor 12 and the capacitor 14 are provided to supply a power voltage Vin, which is smoothed by removing power generation noise of an alternator for example appearing on the power supply line 15. A resistance component of the capacitor 14, is shown equivalently as a series resistor 13.

The power supply line 15 is connected to a VICS power source 16, which generates a DC power voltage Vp (for example, 9 V) supplied to a VICS antenna 28 from the power voltage Vin (for example 12 V) of the in-vehicle power source 10. The power supply line 15 is also connected to a LED driver 20.

The LED driver 20 is configured to drive light emitting diodes (LED set) 22 to emit light by using the power voltage Vin supplied from the power source 10, as a backlight source of a liquid crystal display panel of the navigation device, which includes therein a navigation CPU 62. The LED driver 20 is configured to turn on and off a switching element connected to the LED set 22 in accordance with the duty ratio of a pulse width modulation (PWM) signal applied from a PWM signal generator circuit (not shown), so that the luminance of the LED set 22 may be modulated by a user or based on changes in the brightness in the surrounding area between day and night. The PWM signal generator circuit is configured to generate the PWM signal having the duty ratio, which varies with the on/off condition of a lighting device of the vehicle or manual setting of a user.

The LED driver 20 includes a constant current circuit, which supplies a constant current Iin to the LED set 22 when the switching element is turned on. When the switching element connected to the LED set 22 is turned on and off, the constant current Iin supplied to the LED set 22 is correspondingly turned on and off. Thus, by modulating the duty ratio of the PWM signal, which turns on and off the switching element connected to the LED set 22, the LED set 22 emits light of desired luminance.

The LED driver 20 also includes a booster circuit 200 for generating a light emitting drive voltage for the LED set 22 from the power voltage Vin supplied from the power source 10. The booster circuit 200 has a conventional configuration, which includes a choke coil, diode, capacitor, switching element and the like. When the switching element is duty-controlled, the magnetic energy accumulated in the choke coil is discharged as electric energy and the discharge energy is charged to the capacitor through the diode. Thus, the lighting drive voltage higher than the power voltage is charged in the capacitor.

The VICS power circuit 16 is connected to a VICS power voltage supply line 24, which supplies the power voltage Vp to the VICS antenna 28. A reactor 26 is provided in the VICS power supply line 24. The reactor 26 is provided to reduce transmission of noise, which is included in the VICS power voltage supplied from the VICS power circuit 16, and to restrict transmission of the VICS signal received by the VICS antenna 28 to the VICS power supply line 24.

The VICS antenna 28 is configured as a receiver circuit, which includes a photo diode 30 for receiving optical beacon signal transmitted from a road-side device (not shown) provided on a road and outputting a reception input signal corresponding to the received optical beacon signal. Each reception input data signal, which is outputted by the photo diode 30 is subjected to amplification and other signal processing in the VICS antenna 28, is inputted to a final signal shaper circuit 40 through a power/signal common line 32.

The VICS antenna 28 further includes a light emitting diode (LED), although not shown, as a transmitter antenna for transmitting data signal from the in-vehicle device to the road-side device. The LED provided as the transmitter antenna receives transmission data signal from the navigation CPU 62 partly through the power/signal common line 32. When the transmission data is to be transmitted, reception of the optical beacon signal by the photo diode 30 is stopped so that the reception input data signal and the transmission data signal do not interfere on the power/signal common line 32. The VICS antenna 28 also includes, in addition to the transmitter/receiver antenna for transmitting and receiving the optical beacon signal, an antenna (not shown) for receiving electrical wave beacon signal.

The signal shaper circuit 40 includes a capacitor 42 connected to the power/signal common line 32, on which the reception input data signal is transmitted. The capacitor 42 cuts off the DC component of the reception input data signal and applies only the AC signal component to the positive input terminal of an operational amplifier 50 at a succeeding stage. The positive input terminal of the operation amplifier 50 is connected to a junction between resistors 46 and 48, which are connected in series between the VICS power supply line 24 and the ground. As a result, the VICS power voltage Vp supplied from the VICS power circuit 16 is divided by the resistors 46 and 48 and the divided voltage is applied to the positive input terminal of the operational amplifier 50. The resistors 46 and 48 thus set a DC offset potential of the AC component of the reception input data signal at the positive input terminal of the operational amplifier 50.

A capacitor 44 is connected to the resistor 48 in parallel thereby to form a low pass filter 47 jointly with the resistor 46. The DC offset potential at the positive input terminal of the operational amplifier 50 is thus maintained at a substantially fixed level even when noise is superimposed on the VICS power supply line 24.

A resistor 52 is connected between the negative input terminal of the operational amplifier 50 and the ground. A resistor 54 is connected between the output terminal and the input terminal of the operational amplifier 50. The operational amplifier 50 amplifies the reception input data signal relative to the DC offset potential as a reference by an amplification rate (gain), which is determined by a ratio of the resistances of the resistors 52 and 54. The input data signal amplified by the operational amplifier 50 is applied to the positive input terminal of a comparator 60 as an amplified input data signal V50. A resistor 56 and a capacitor 58 are configured to form a low pass filter 59, which filters out or removes high frequency components from the amplified reception input data signal. The comparator 60 receives at the negative input terminal thereof a filter-processed signal as a reference signal Vr thereof.

The comparator 60 compares the two, signals V50 and Vr applied to the positive input terminal and the negative input terminal thereof and outputs an output signal V60 as a reception output data signal having "1" or "0" level in accordance with the comparison result. The signal shaper circuit 40 outputs to the navigation CPU 62 the reception output data signal after waveform-shaping to the signal V60. The navigation CPU 62 is configured as a signal processing circuit, which acquires road traffic information from the inputted reception output data signal V60, to provide passengers in the vehicle the road traffic information by displaying it on the road map or announcing by voice sound.

The operation of the embodiment 40 will be described next.

In the in-vehicle system shown in FIG. 1, the LED driver circuit 20 drives the LED set 22 to emit light with the power voltage Vin supplied by the power supply line 15. To variably modulate the luminance of emitted light, the supply current Iin to the LED set 22 is turned on and off in accordance with the PWM signal. When the supply current Iin to the LED set 22 is turned from on to off or from off to on, the input voltage Vin supplied to the LED set 22 also changes due to the supply current change and the resistor 13. As a result, modulation noise Vn is developed on the power supply line 15. Since this light modulation noise Vn developed on the power supply line 15 also enters the VICS power circuit 16, the VICS power voltage Vp produced by the VICS power circuit 16 also includes such noise Vn.

Figure 2A:
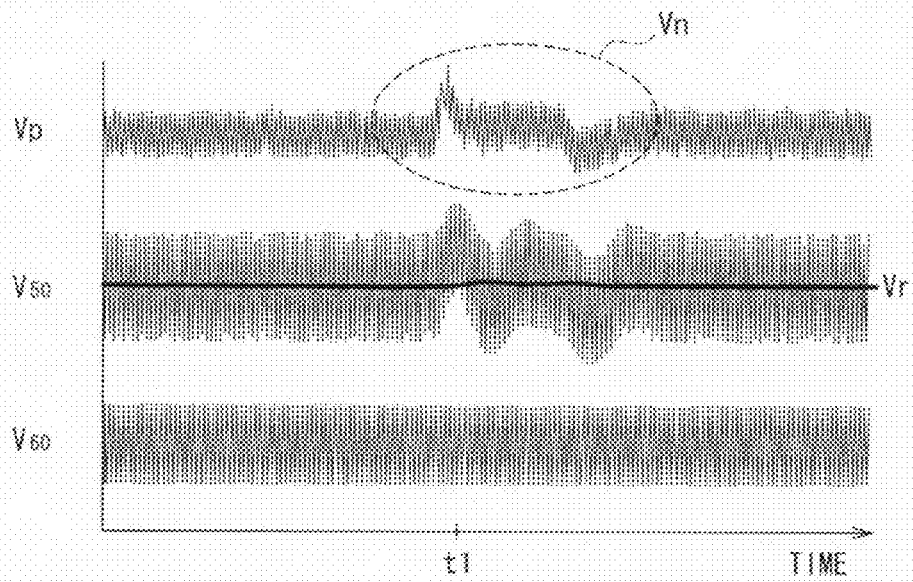
FIGS. 2A and 2B are time charts showing signals developed in a final signal shaper circuit in the communication device, in which noise included in a reception signal is cut off.
Figure 2B:
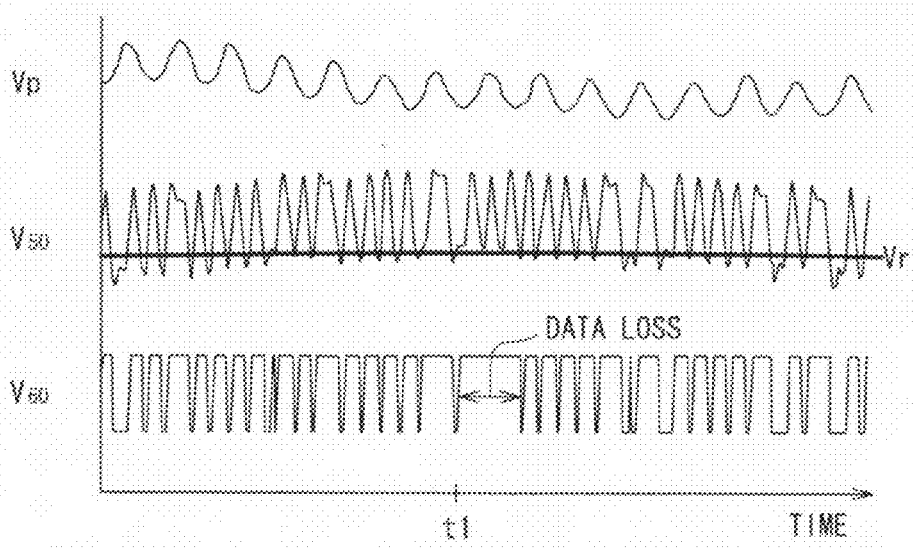

When the light modulation noise Vn is superimposed on the VICS power voltage Vp supplied through the VICS power voltage supply line 24, the following problem will be caused as shown in FIGS. 2A and 2B. FIG. 2B is an enlargement of a part of waveforms shown in FIG. 2A.

As shown in FIG. 2A, when the light modulation noise Vn is superimposed on the VICS power voltage Vp supplied by the VICS power circuit 16, the VICS power voltage Vp changes its magnitude rapidly and largely in accordance with the waveform (for example, sinusoidal wave) of the light modulation noise Vn. The VICS power voltage Vp fluctuates at a frequency much higher than that of the noise Vn as understood from FIGS. 2A and 2B. This fluctuation is caused by noise generated by duty-controlling the switching element of the booster circuit (not shown) in the LED driver circuit 20. For example, the frequency of the light modulation noise Vn is about 150 Hz, while the frequency of noise generated in duty-controlling the switching element of the booster circuit is about 300 to 400 kHz.

The VICS power voltage Vp including the light modulation noise Vn is supplied to the power/signal common line 32 after certain attenuation of the noise Vn by the reactor 26. As a result, the input data signal supplied through the power/signal common line 32 and hence the input data signal V50 produced by the operation amplifier 50 also varies with the magnitude and frequency of the noise Vn.

Here, the cutoff frequency of the low pass filter 59 connected to the negative input terminal of the comparator 60 is assumed to be set to be very low. In this case, when the DC component of the input data signal V50 is applied to the negative input terminal of the comparator 60, the lowest voltage (minimum peak level) of the input data signal Vin varying in correspondence to the noise Vn may happen to become higher than the DC component Vr of the reception data signal inputted to the negative input terminal of the comparator 60 around time t1 as shown in FIG. 2A.

The comparator 60, comparing the input data signal V50 and the reference signal Vr (DC component of the input data signal V50), produces an output signal, which is in reverse to a normal output signal. As a result, as shown in FIG. 2B in enlarged form, some of the reception data is lost around time t1, resulting in that the comparator 60 cannot output the reception output data signal in a correctly waveform-shaped condition.

In this embodiment, therefore, the cutoff frequency of the low pass filter 59 formed by the resistor 56 and the capacitor 58 is so set as to pass the light modulation noise Vn but cut off the input data signal of other frequencies higher than the set cutoff frequency. In one exemplary case, the frequency of the reception input data signal equals the signal frequency of the optical beacon signal (512 kHz/1024 kHz).

The cutoff frequency of the low pass filter 59 is set in the following manner.

Figure 3:
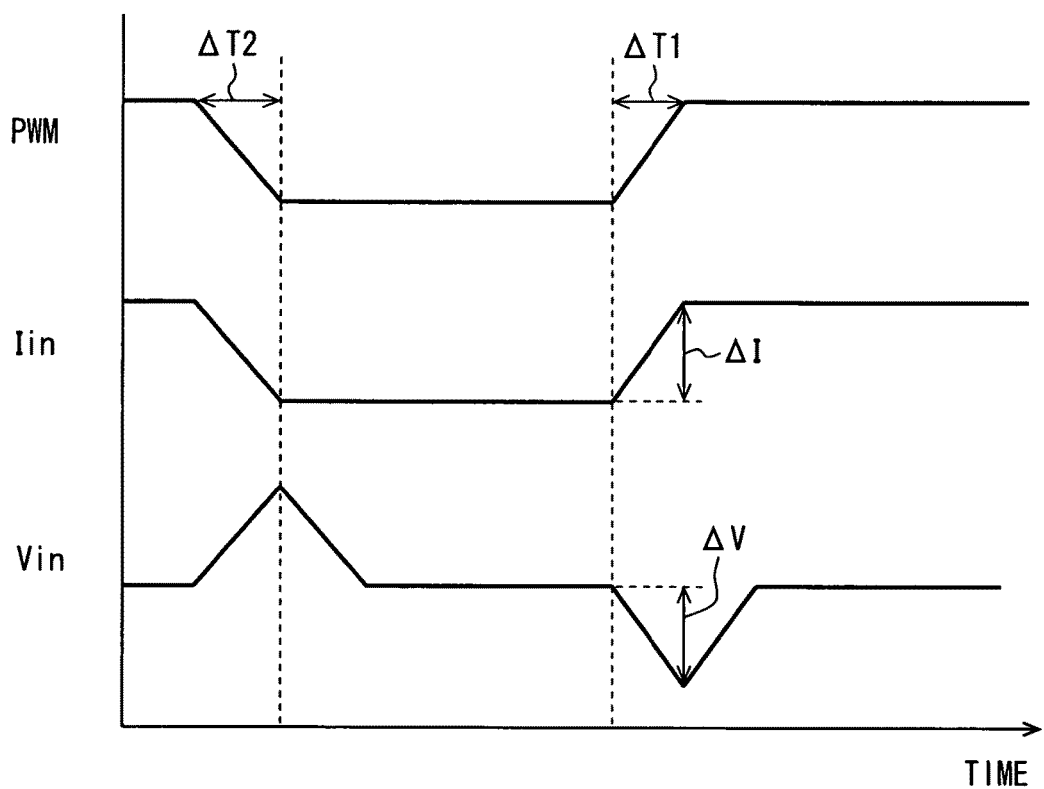
FIG. 3 is a time chart showing signals developed in selecting a cutoff frequency of a low pass filter in the communication device.

As described above, the light modulation noise Vn is caused by the periodic turning on and off of the current supplied to the LED set 22 and not by irregular load change. Therefore, the noise Vn has a substantially fixed frequency component. Specifically, as shown in FIG. 3, the frequency of the input voltage Vin of the LED set 22 caused by the turning on and off of the current Iin supplied to the LED set 22 depends on a rise time $\Delta T1$ and a fall time $\Delta T2$ of the PWM signal. The rise time $\Delta T1$ is a period, in which the current supplied to the LED set 22 increases from 0 A to a fixed level. The fall time $\Delta T2$ is a period, in which the current supplied to the LED set 22 decreases from the fixed level to 0 A.

The light modulation noise Vn thus includes a frequency component f1 (proportional to $1/\Delta T1$) corresponding to the rise time $\Delta T1$ and a frequency component f2 (proportional to $1/\Delta T2$) corresponding to the fall time $\Delta T2$. The resistance R of the resistor 56 and the capacitance C of the capacitor 58 is so set that the cutoff frequency fc ($=1/(2\pi RC)$) of the low pass filter 59 becomes higher than the frequency components f1 and f2 of the light modulation noise Vn.

The low pass filter 59 shown in FIG. 1 is a first-order filter and its attenuation rate is about −20 dB/dec. If the frequency components f1 and f2 of the light modulation noise Vn are close to the frequency of the input data signal, it sometimes arises that the cutoff frequency fc of the low pass filter 59 cannot be so set to pass the frequency components of the light modulation noise and to cut off the input data signal. In this case, it is preferred to configure the low pass filter as a higher-order low pass filter having a higher attenuation rate.

Figure 4A:
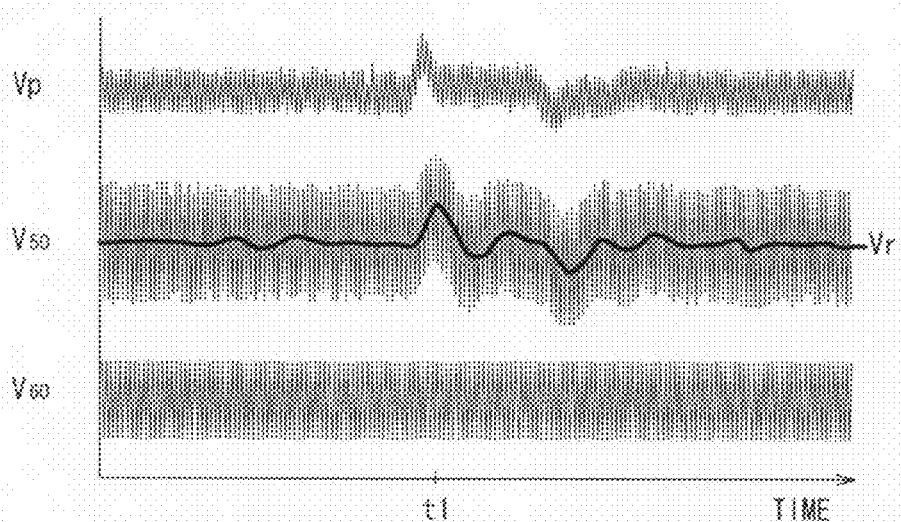
FIGS. 4A and 4B are time charts showing signals developed in the signal shaper circuit in the communication device, in which noise included in the reception signal is not cut off.
Figure 4B:
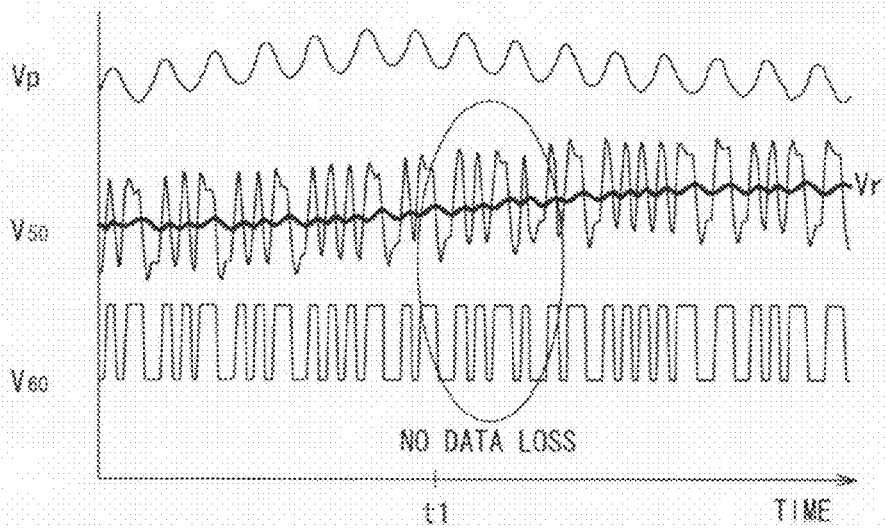

The operation of the signal shaper circuit 40 is described next with reference to FIGS. 4A and 4B. FIG. 4B shows in enlarged manner a part of the waveform shown in FIG. 4A. The signal shaper circuit 40 is configured so that the cutoff frequency fc of the low pass filter 59 is set to be higher than the frequency components f1 and f2 of the light modulation noise.

With the cutoff frequency fc of the low pass filter 59 being set higher than the frequency components f1 and f2 of the light modulation noise Vn so that the input data signal may be cut off, the filter-processed signal Vr applied as the reference signal to the negative input terminal of the comparator 60 varies at a frequency, which corresponds to the frequency components of the light modulation noise. As a result, even when the input data signal V50 varies due to superimposition of the light modulation noise, it will be maintained near a level generally intermediate the maximum peak (highest level) and the minimum peak (lowest level) of the input data signal. The comparator 60 compares the input data signal V50 with the filter-processed signal Vr and produces the output data signal V60 in the properly shaped pulse waveform, which has no data signal loss as opposed to the case shown in FIG. 2B. The navigation CPU 62 can thus acquire road traffic information from the output data signal V60, even when the light modulation noise Vn is superimposed.

The present invention is not limited to the disclosed embodiment but may be implemented in different ways.

For example, in the embodiment, the cutoff frequency fc of the low pass filter 59 provided at the negative terminal of the comparator 60 is set in correspondence to the known frequency of the light modulation noise Vn. However it often arises that various noises other than the light modulation noise is superimposed on the VICS power supply line 24. In such a case, the frequency of noise superimposed is varied and is not known. If the cutoff frequency of the low pass filter 59 is fixed (for example, 30 to 40 kHz), it may arise that some of the output data signal is lost.

Figure 5:
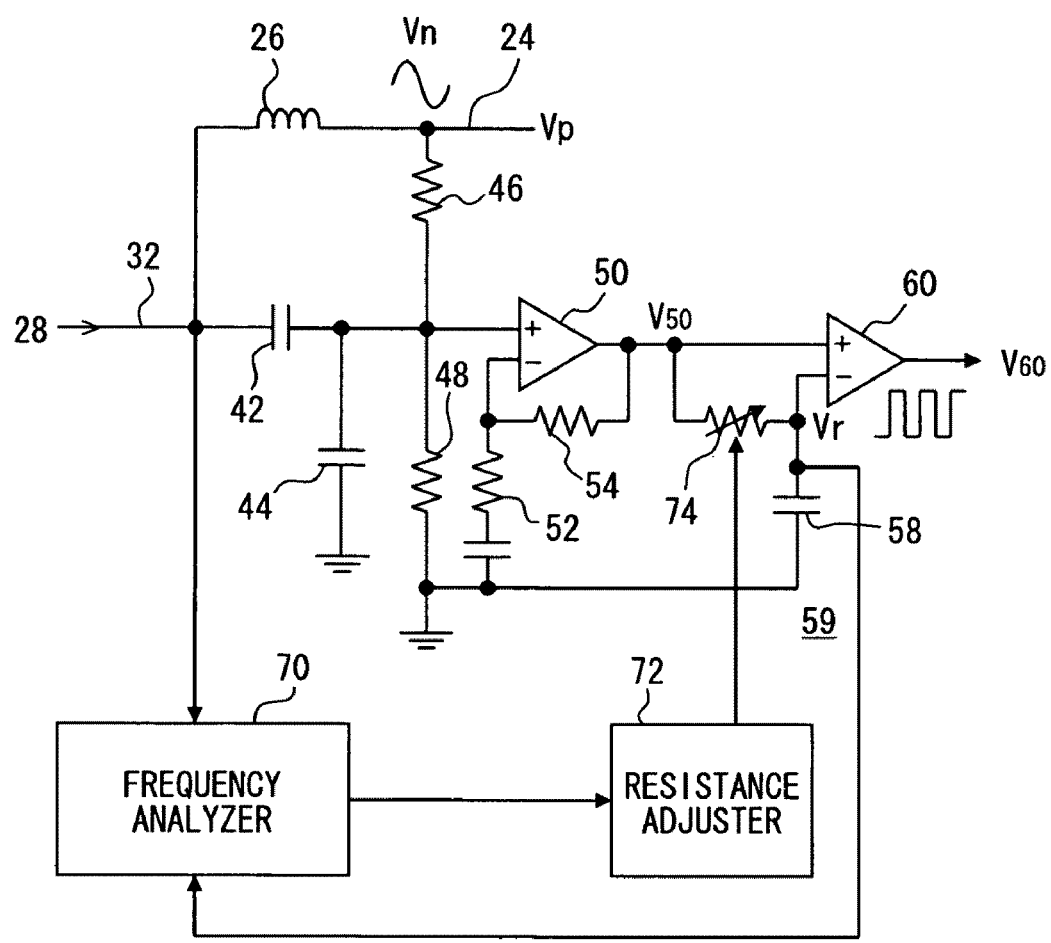
FIG. 5 is an electric circuit diagram of the signal shaper circuit according to a modification of the embodiment shown in FIG. 1.

To counter this problem, the signal shaper circuit 40 is preferably configured as shown in FIG. 5. In the signal shaper circuit 40, a frequency analyzer circuit 70, a resistance adjuster circuit 72 and a variable resistor 74 are provided. The frequency analyzer circuit 70 is configured to analyze the frequency of noise superimposed on the VICS power supply line 24. The resistance adjuster circuit 74 is configured to adjust the resistance of the variable resistor 74 so that the frequency of the analyzed noise may be passed to the negative input terminal of the comparator 60 based on the result of analysis of the frequency analyzer circuit 70. According to this configuration, even when noise of different frequency other than the fixed frequency noise like the light modulation noise Vn are superimposed on the VICS power supply line 24, the filter-processed signal (reference signal Vr) applied to the comparator 60 can be varied in accordance with the superimposed noise. Thus, it becomes possible to output the output data signal in the waveform-shaped form without loss of data signal.

The frequency analyzer circuit 70 is configured to further analyze the frequency of the filter-processed signal applied to the comparator 60 by feeding back the filter-processed signal Vr. The frequency analyzer circuit 70 varies the resistance of the variable resistor 74 by way of the resistance adjuster circuit 72 so that the frequency of noise included in the input data signal matches the frequency of the filter-processed signal Vr produced by the low pass filter 59. By thus adjusting the cutoff frequency of the low pass filter 59 by the feedback control, the cutoff frequency fc of the low pass filter 59 can be set surely so that the noise superimposed on the VICS power supply line 24 can be passed through the low pass filter 59.

What is claimed is:
1. A communication device comprising:
a power supply line for supplying electric power;
a receiver circuit, connected to the power supply line, for receiving a communication signal from an external site and outputting a reception signal to a signal processing circuit through the power supply line,
the reception signal including a frequency component higher than a predetermined frequency of noise, which develops on the power supply line;
a set of resistors, connected in series between the power supply line and ground, that divides a power supply voltage of the power supply line thereby producing an offset potential;
a power/signal common line connected to the power line;
a capacitor connected between the power/signal common line and the set of resistors to produce only an AC component signal of the reception signal, which varies relative to the offset potential;
a low pass filter, connected to the capacitor, for passing the noise of the predetermined frequency as a reference signal and cutting off the AC component signal of frequencies higher than the predetermined frequency; and
a comparator, provided to receive the AC component signal produced from the capacitor and the reference signal from the low pass filter, for producing an output data signal as a result of a comparison of the reception signal and the reference signal.

2. The communication device according to claim 1, wherein:
the receiver circuit is provided in a vehicle to receive, as the communication signal, a signal including road traffic information;
the signal processing circuit is provided in the vehicle to display the road traffic information on a display panel including a light emitting diode set as a backlight source; and
the light emitting diode set is duty-controlled to turn on and off for emitting backlight thereby generating the noise of the predetermined frequency as light modulation noise.

3. The communication device according to claim 2, wherein:
a cutoff frequency of the low pass filter at which the AC component is cut off for being higher than the predetermined frequency is determined as a function of a rise time or a fall time of a pulse-width modulation signal, by which the light emitting diode set is duty-controlled.

4. The communication device according to claim 3, further comprising:
a booster circuit for generating a drive voltage for the light emitting diode set from a power voltage of the power supply line by turning on and off a switching element at a frequency higher than the predetermined frequency.

5. The communication device according to claim 4, wherein:
the cutoff frequency is in a range from 30 to 40 kHz; and
the frequency of turning on and off the switching element of the booster circuit is in a range from 300 to 400 kHz.

6. A communication device, comprising:
a power supply line for supplying electric power;
a receiver circuit, connected to the power supply line, for receiving a communication signal from an external site and outputting a reception signal to a signal processing circuit through the power supply line,
the reception signal including a frequency component of noise, which develops on the power supply line, the frequency component varying as produced by one or more sources;
a set of resistors, connected in series between the power supply line and ground, that divides a power supply voltage of the power supply line thereby producing an offset potential;
a power/signal common line connected to the power line;
a capacitor connected between the power/signal common line and the set of resistors to produce only an AC component signal of the reception signal, which varies relative to the offset potential;
a frequency analyzer circuit, connected with the power/signal common line, for determining the frequency component of the noise;
a variable low pass filter, connected to the capacitor, for cutting out the AC component signal of a frequency higher than the frequency component of the noise as determined by the frequency analyzer circuit, and passing the noise as a reference signal; and
a comparator, provided to receive the AC component signal produced from the capacitor and the reference signal from the low pass filter, for producing an output data signal resulting from a comparison of the reception signal and the reference signal.

7. The communication device according to claim 6, further comprising:

an adjuster circuit, connected between the frequency analyzer circuit and the variable low pass filter, that adjusts a variable resistor in the variable low pass filter, based upon the determination of the frequency component of the noise by the analyzer circuit, in order to cut out the AC component signal of a frequency higher than the frequency component of the noise.

8. The communication device according to claim 7, wherein:

the frequency analyzer circuit is connected in feedback with the variable low pass filter so as to receive the reference signal, and the adjuster circuit adjusts the variable resistor such that the frequency component of the noise matches the reference signal.

9. The communication device according to claim 7, wherein:

the receiver circuit is provided in a vehicle to receive, as the communication signal, a signal including road traffic information;

the signal processing circuit is provided in the vehicle to display the road traffic information on a display panel including a light emitting diode set as a backlight source; and the light emitting diode set, as one of the one or more sources, is duty-controlled to turn on and off for emitting backlight thereby generating, as light modulation noise, a portion of the frequency component of the noise.

10. The communication device according to claim 9, wherein:

an additional portion of the frequency component of the noise is generated from a second of the one or more sources.

11. The communication device according to claim 1, wherein:

the output data signal has a "1" or "0" level in accord with the result of the comparison.

* * * * *